United States Patent [19]
Alfes et al.

[11] Patent Number: 4,895,930

[45] Date of Patent: Jan. 23, 1990

[54] PROCESS FOR ISOLATING POLYARYLENE SULPHIDES

[75] Inventors: Franz Alfes; Wolfgang Alewelt, both of Krefeld; Wolfgang Eisermann, Duesseldorf; Erhard Tresper, Krefeld, all of Fed. Rep. of Germany

[73] Assignee: Bayer Aktiengesellschaft, Leverkusen, Fed. Rep. of Germany

[21] Appl. No.: 214,010

[22] Filed: Jun. 30, 1988

[30] Foreign Application Priority Data

Jul. 11, 1987 [DE] Fed. Rep. of Germany ....... 3723071

[51] Int. Cl.[4] .................... C08J 3/00; C08G 75/02
[52] U.S. Cl. .................... 528/499; 528/388; 528/503

[58] Field of Search .............. 528/388, 503, 499; 525/537

[56] References Cited

U.S. PATENT DOCUMENTS 4,748,231  5/1988  Nasheiwat ............... 528/488

FOREIGN PATENT DOCUMENTS 49232  3/1984  Japan ................. 528/388

*Primary Examiner*—Lewis T. Jacobs
*Assistant Examiner*—David W. Woodward
*Attorney, Agent, or Firm*—Connolly and Hutz

[57] ABSTRACT

The invention relates to a process for purifying and isolating polyarylene sulphides. In this process polyarylene sulphides are obtained with a particularly low electrolyte content.

1 Claim, No Drawings

PROCESS FOR ISOLATING POLYARYLENE SULPHIDES

The invention relates to a process for purifying and isolating polyarylene sulphides. In this process polyarylene sulphides are obtained with a particularly low electrolyte content.

Polyarylene sulphides (PPS), their production and isolation are already known (e.g. U.S.-PS No. 2 513 188). In general when isolating polyarylene sulphides, the heterogeneous solution containing salts, which is produced after the polymerisation reaction, is placed in water or low alcohols, such as methanol, ethanol or isopropyl alcohol and polyarylene sulphide is precipitated. The form of precipitation can be affected in many ways by atomisation through a nozzle, by feeding onto toothed discs rotating in the precipitant, or by placing into a wet mill or a Supraton, which rotate in the precipitant. The PPS obtained always still contains inorganic salts and/or solutions thereof. Even in washed and dried polyarylene sulphide there is still evidence of residues of >1.000 ppm inorganic ions, e.g. chloride.

It has now been found that the inorganic ion content e.g. chloride content, of polyarylene sulphide can be lowered to <5 ppm, firstly if the reaction solution is allowed to cool without agitation and at a predetermined temperature gradient, secondly if the crystalline residue obtained is finely ground and thirdly if the ground product is treated with water and/or an organic extractant.

Object of the invention is thereby a process for purifying polyarylene sulphides, characterised in that the reaction solution obtained from the polymerisation reaction for producing polyarylene sulphides, is cooled to a temperature between 30° and 70° C. having a cooling rate of 0.1° to 20° C., preferably 1° to 5° C. per second, in that the cooled product is ground, and in that it is then treated with water and/or an organic solvent at a temperature between 30° and 70° C.

According to the invention the cooling process can take place for example in the reaction vessel or in small vessels, which enable heat to be exchanged rapidly with the environment. It is particularly advantageous to use a conventional cooling conveyor, with which the temperature gradient of the cooling process can be adjusted. According to the invention the cooling rate is 0.1° to 20° C., preferably 1° to 5° C. per second. During the cooling process products are obtained which consist of crystallised PPS, solvent and secondary inorganic constituents, e.g. NaCl, and are then finely ground. The ground product has a high filtering speed if the proportion of very finely ground material is low.

When purifying according to the invention, preferably one part e.g. that of NaCl, is already separated from the still hot reaction solution at temperatures of between 240° C. and 220° C. by hot filtration or by means of a decanter (e.g. according to EP 871 000 87). The solution is then cooled to approximately 30° to 70° C., preferably 40° to 60° C. The reaction solution which has now solidified and which has left the cooling conveyor, is coarsely ground and added to water and/or organic extractant, so that it becomes a workable pulp (mash). Standard commercial separators, wet mills etc can be used for grinding. The PPS is then separated by filtering using conventional filtering devices such as vacuum filters, agitated pressure filters or filtering conveyor belts, which can also operate at over, under or normal pressures. It is advantageous that the isolated PPS can then once again be washed with water and/or an organic extractant.

The PPS which is purified by the process according to the invention, is finely powdered, has a high density (up to 0.5 g/cm$^3$), is characterised by a low electrolyte content (e.g. inorganic chloride) after washing and has particularly good electrical properties. As a result of the low electrolyte content it has been noticed that when processing e.g. injection moulding, there is only slight corrosion on the moulds used.

The polyarylene sulphides treated according to the invention can be compounded with other polymers, pigments and fillers, e.g. graphite, powdered metal, glass powder, silica flour or glass fibres, or they can be added to other conventional additives such as stabilisers and mould extraction agents. They can be directly processed into sheets, moulded articles or fibres by extrusion, extrusion blowing, injection moulding or other conventional processing techniques. These processed forms can be conventionally used e.g. as automobile components, fittings, electrical components, e.g. switches, bars and electronic panels, chemical-resistant and weather-proof components such as pump casing and pump impellers, etching bath dishes, gaskets, components for office machines and telecommunications equipment, and domestic appliances, valves and ball-bearing components etc.

EXAMPLES

Producing a Polyphenylene Sulphide 77 400 g sodium sulphide trihydrate (600 Mol Na$_2$S), 12 246 g sodium acetate trihydrate 15 MOl-% related to Na$_2$S) and 2401N-methyl caprolactam are placed in a 600 l tank fitted with agitator and column, and heated at 200° C. A liquid is thereby distilled, which essentially consists of water. Then 88 200 g 1.4-dichlorobenzene, which is dissolved in 30 l N-methyl caprolactam, is added and the reaction mixture is heated to 240° C. and is left for 5 hours at this temperature.

EXAMPLE 1

A polyphenylene sulphide solution produced for example following the process described above, is spread evenly over the whole width of a special steel cooling conveyor belt, which has an effective length of 5.0 m and an effective width of 0.6 m and is cooled from below with cooling water at 17° C. (cooling water quantity 3.2 m$^3$/h) and at a speed of 10 m/min. The polyphenylene sulphide solution has a volume of 600 kg/h, a product temperature of 200° C. and a layer thickness of 3–4 mm. The solidified product, which has cooled to approximately 50° C. at the end of the cooling conveyor, is broken into pieces and together with a compound of 20 parts/vol water and 80 parts/vol isopropyl alcohol in the ratio 1:5 (polyarylene solution:aqueous isopropyl alcohol) is ground to a grain size range of 500–100 μm using a wet mill. The pulp is passed on to a vacuum filter, filtered by suction and washed with distilled water until the water, which has drained away, has a conductivity of <5 μs. After drying for 12 hours at 130° C. and 20 mbar, a content of inorganic chloride less than (<) 5 ppm is established in the polyarylene sulphide.

We claim:

1. Process for purifying polyarylene sulphides, characterised in that the reaction solution obtained from the polymerisation reaction for producing polyarylene sulphides, is cooled to a temperature between 30° and 70° C. having a cooling rate of 1° to 5° C. per second, in that the cooled product is ground, and in that it is then treated with water or an organic solvent or both.

* * * * *